United States Patent
Henry et al.

(10) Patent No.: US 9,393,636 B2
(45) Date of Patent: Jul. 19, 2016

(54) SYSTEMS AND METHODS TO FACILITATE THE STARTING AND STOPPING OF ARC WELDING PROCESSES

(71) Applicant: Lincoln Global, Inc., City of Industry, CA (US)

(72) Inventors: Judah Benjamin Henry, Geneva, OH (US); James E. Hearn, Brunswick, OH (US); Daniel P. Fleming, Painsville, OH (US)

(73) Assignee: Lincoln Global, Inc., City of Industry, CA (US)

( * ) Notice: Subject to any disclaimer, the term of this patent is extended or adjusted under 35 U.S.C. 154(b) by 615 days.

(21) Appl. No.: 13/777,366

(22) Filed: Feb. 26, 2013

(65) Prior Publication Data

US 2014/0131332 A1    May 15, 2014

Related U.S. Application Data

(60) Provisional application No. 61/725,789, filed on Nov. 13, 2012.

(51) Int. Cl.
*B23K 9/10* (2006.01)
*B23K 9/067* (2006.01)
*B23K 9/095* (2006.01)
*B23K 9/12* (2006.01)

(52) U.S. Cl.
CPC ............ *B23K 9/1006* (2013.01); *B23K 9/0671* (2013.01); *B23K 9/0673* (2013.01); *B23K 9/095* (2013.01); *B23K 9/125* (2013.01)

(58) Field of Classification Search
CPC .... B23K 9/0671; B23K 9/0673; B23K 9/095; B23K 9/1006; B23K 9/125
USPC .............................. 219/130.21, 124.02, 125.1
See application file for complete search history.

(56) References Cited

U.S. PATENT DOCUMENTS

| | | | | |
|---|---|---|---|---|
| 3,666,906 A | * | 5/1972 | Byrne | ........................ 219/76.14 |
| 3,975,616 A | * | 8/1976 | Siktberg | ............... B23K 9/0671 |
| | | | | 219/124.01 |
| 4,321,451 A | * | 3/1982 | Inoue | ..................... B23Q 15/08 |
| | | | | 219/69.13 |
| 4,861,965 A | * | 8/1989 | Stava | ........................ 219/130.51 |
| 5,117,088 A | * | 5/1992 | Stava | ...................... 219/137 PS |

(Continued)

FOREIGN PATENT DOCUMENTS

| DE | EP 0147637 A2 * | 7/1985 | |
|---|---|---|---|
| DE | 3731180 A1 * | 3/1989 | ............... B23K 9/06 |

(Continued)

OTHER PUBLICATIONS

PCT/IB2013/002533—Partial Search Report and Invitation to Pay Additional Fees—mailed Aug. 6, 2014.

*Primary Examiner* — Dana Ross
*Assistant Examiner* — Ket D Dang
(74) *Attorney, Agent, or Firm* — Foley & Lardner LLP

(57) ABSTRACT

Systems and methods for facilitating the starting and stopping of arc welding processes, as well as for responding to events in mid-weld. Specially designed signals may be briefly applied between a welding electrode and a welding workpiece at the start and end of a welding process to gracefully and properly start and stop a weld. Furthermore, specially designed signals may be briefly applied in the middle of a welding process, if determined events occur, to counter the undesirable effects of the events.

18 Claims, 10 Drawing Sheets

(56) References Cited

U.S. PATENT DOCUMENTS

| | | | | |
|---|---|---|---|---|
| 5,187,348 A * | 2/1993 | Cuba | ...................... | B23K 9/073 |
| | | | | 219/124.02 |
| 5,349,157 A * | 9/1994 | Blankenship | ............ | 219/130.32 |
| 6,376,802 B1 * | 4/2002 | Tong et al. | .............. | 219/137 PS |
| 7,166,817 B2 * | 1/2007 | Stava | .................. | B23K 9/1068 |
| | | | | 219/130.5 |
| 2005/0161447 A1 | 7/2005 | Kaufman et al. | | |
| 2006/0207983 A1 * | 9/2006 | Myers et al. | ............ | 219/137 PS |
| 2008/0041834 A1 * | 2/2008 | Nishimura | ................ | 219/125.1 |
| 2009/0107959 A1 | 4/2009 | Khakhalev et al. | | |
| 2010/0176109 A1 * | 7/2010 | Peters | ...................... | 219/137.61 |
| 2011/0297658 A1 * | 12/2011 | Peters et al. | ................... | 219/162 |
| 2012/0074112 A1 | 3/2012 | Kotera et al. | | |
| 2012/0074119 A1 * | 3/2012 | Watanabe | ...................... | 219/216 |

FOREIGN PATENT DOCUMENTS

| | | | |
|---|---|---|---|
| FR | 2212206 A1 * | 7/1974 | |
| KR | 20010107970 | 12/2001 | |

* cited by examiner

SYSTEMS AND METHODS TO FACILITATE THE STARTING AND STOPPING OF ARC WELDING PROCESSES

This U.S. patent application claims priority to and the benefit of U.S. provisional patent application Ser. No. 61/725,789 filed on Nov. 13, 2012, which is incorporated herein by reference in its entirety.

TECHNICAL FIELD

Certain embodiments of the present invention relate to arc welding. More particularly, certain embodiments of the present invention relate to systems and methods facilitating the starting and stopping of arc welding processes.

BACKGROUND

Certain prior art welding systems use limited techniques and/or rely on the welding operator to start or stop a welding process when creating a weld. As a result, the ability to consistently establish an arc with limited spatter at the beginning of a welding process or properly fill a crater at the end of a welding process may be restricted and may require significant training and experience of the welder.

Further limitations and disadvantages of conventional, traditional, and proposed approaches will become apparent to one of skill in the art, through comparison of such systems and methods with embodiments of the present invention as set forth in the remainder of the present application with reference to the drawings.

SUMMARY

In certain welding applications (e.g., GMAW welding processes using consumable welding electrodes), it is desirable to start a welding process without stubbing the electrode to the workpiece, and without creating a large amount of spatter. Furthermore, it is desirable to end a welding process without leaving a crater that is susceptible to cracking. However, the ability to gracefully start a welding process and to properly end a welding process is not always straightforward, and may require much skill and experience (and possibly additional work) by the welder. Systems and methods for facilitating the starting and stopping of arc welding processes are disclosed herein. For example, specially designed signals may be briefly applied between a welding electrode and a welding workpiece at the start and end of a welding process. Furthermore, specially designed signals may be briefly applied in the middle of a welding process if determined events occur (e.g., if the arc goes out).

In one embodiment of the present invention, a signal of sufficient energy is applied to a welding electrode at the start of welding to melt back the electrode to prevent stubbing. An arc welding system having a power source and a wire feeder is provided. The power source is configured to provide a welding output current to generate an arc between a consumable welding electrode and a welding workpiece during a welding process. The wire feeder is operatively connected to the power source and is configured to feed the electrode during the welding process. The power source and the wire feeder are also configured to sense when the electrode first contacts the workpiece at the start of welding as the electrode is advanced toward the workpiece by the wire feeder and apply a first signal of sufficient energy to the electrode in response to sensing when the electrode first contacts the workpiece to initially melt back the electrode from the workpiece. In accordance with an embodiment, a negative polarity portion of the first signal provides the sufficient energy to initially melt back the electrode from the workpiece. The power source and the wire feeder may also be configured to subsequently apply a second signal to the electrode to start creating a weld. The second signal may include one or more of a cyclical DC positive welding output current signal, a cyclical DC negative welding output current signal, or a cyclical AC welding output current signal. The power source may include a voltage feedback circuit operatively connected to a controller and configured to sense when the electrode first contacts the workpiece at the start of welding. The power source may include a current feedback circuit operatively connected to a controller and configured to sense when the electrode first contacts the workpiece at the start of welding.

In one embodiment of the present invention, a signal of sufficient voltage and frequency is applied between a welding electrode and a welding workpiece at the start of welding to establish an arc by jumping a gap between the electrode and the workpiece. An arc welding system having a power source and a wire feeder is provided. The power source is configured to provide a welding output current to generate an arc between a consumable welding electrode and a welding workpiece during a welding process. The wire feeder is operatively connected to the power source and is configured to feed the electrode during the welding process. The power source and the wire feeder are also configured to step-feed the electrode towards the workpiece at the start of welding and apply a first signal of sufficient voltage and frequency between the electrode and the workpiece to establish an arc between the electrode and the workpiece before the electrode first makes contact with the workpiece. The power source and the wire feeder may also be configured to apply a second signal between the electrode and the workpiece to start creating a weld once the arc is established. The second signal may include one or more of a cyclical DC positive welding output current signal, a cyclical DC negative welding output current signal, or a cyclical AC welding output current signal. As an option, the system may include a dedicated high frequency generator circuit configured to generate the first signal of sufficient voltage and frequency.

In one embodiment of the present invention, a signal of sufficient voltage and frequency is applied between a welding electrode and a welding workpiece at the start of welding to establish an arc by jumping a gap between the electrode and the workpiece. An arc welding system having a power source and a wire feeder is provided. The power source is configured to provide a welding output current to generate an arc between a consumable welding electrode and a welding workpiece during a welding process. The wire feeder is operatively connected to the power source and is configured to feed the electrode during the welding process. The power source and the wire feeder are also configured to feed the electrode towards the workpiece at the start of welding in a de-energized (i.e., a non-welding state), sense when the electrode first makes contact with the workpiece, pull the de-energized electrode a determined distance away from the workpiece, and apply a first signal of sufficient voltage and frequency between the electrode and the workpiece to establish an arc between the electrode and the workpiece. The power source and the wire feeder may be further configured to apply a second signal between the electrode and the workpiece corresponding to a cyclical welding waveform process to start creating a weld once the arc is established. A current level of the second signal may be ramped up to a determined welding current level to create a smooth transition from the establishment of the arc, in accordance with an embodiment.

In one embodiment of the present invention, a polarity type of a welding output waveform is switched at the end of a welding process. An arc welding system having a power source and a wire feeder is provided. The power source is configured to provide a welding output current waveform of a first DC polarity to generate an arc between a consumable welding electrode and a welding workpiece during a welding process. The wire feeder is operatively connected to the power source and is configured to feed the electrode during the welding process. The power source and the wire feeder are also configured to sense when the welding process is about to finish and switch the welding output current waveform to one of a second DC polarity being opposite the first polarity, or to an alternating polarity, in response to sensing when the welding process is about to finish. In accordance with various embodiments, a lost trigger signal to the wire feeder, or a determined trigger signal sequence to the wire feeder, may indicate that the welding process is about to finish.

In one embodiment of the present invention, a polarity type of a welding output waveform is switched during a welding process. An arc welding system having a power source and a wire feeder is provided. The power source is configured to provide a welding output current waveform of a first polarity type to generate an arc between a consumable welding electrode and a welding workpiece during a welding process. The wire feeder is operatively connected to the power source and is configured to feed the electrode during the welding process. The power source and the wire feeder are also configured to sense an event during the welding process and switch the welding output current waveform to a second polarity type, being different from the first polarity type, in response to sensing the event until the event is overcome. The event may include one or more of an arc extinction event or a stubbing event. The welding output waveform having the second polarity type may be configured to affect one or more of arc re-ignition, electrode burn back from the workpiece, or diminished arc blow. The first polarity type may include one of an alternating polarity type, a DC positive polarity type, or a DC negative polarity type. The second polarity type may include one of an alternating polarity type, a DC positive polarity type, or a DC negative polarity type.

Details of illustrated embodiments of the present invention will be more fully understood from the following description and drawings.

DETAILED DESCRIPTION

Figure 1:
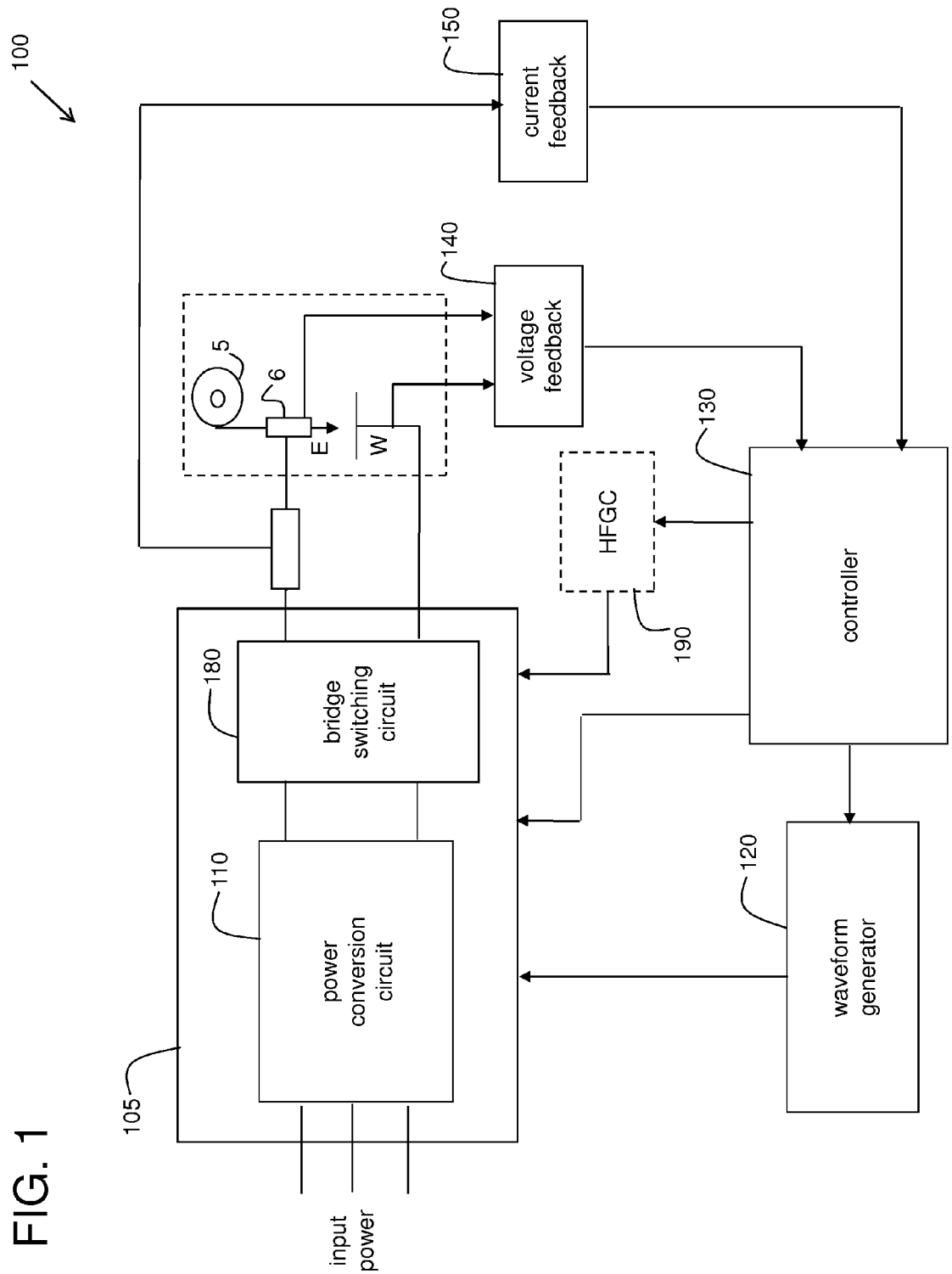
FIG. 1 illustrates a schematic block diagram of an exemplary embodiment of an arc welding system operatively connected to a consumable welding electrode and a workpiece.

The following are definitions of exemplary terms that may be used within the disclosure. Both singular and plural forms of all terms fall within each meaning:

"Software" or "computer program" as used herein includes, but is not limited to, one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, an application, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"Computer" or "processing element" or "computer device" as used herein includes, but is not limited to, any programmed or programmable electronic device that can store, retrieve, and process data. "Non-transitory computer-readable media" include, but are not limited to, a CD-ROM, a removable flash memory card, a hard disk drive, a magnetic tape, and a floppy disk.

"Welding tool", as used herein, refers to, but is not limited to, a welding gun, a welding torch, or any welding device that may guide a consumable welding electrode to a workpiece, provide a delivery system and diffuser for dispersing a shielding gas, and/or provide for applying electrical power (from a welding power source) to the welding wire.

"Welding output circuit path", as used herein, refers to the electrical path from a first side of the welding output of a welding power source, through a first welding cable (or a first side of a welding cable), to a welding electrode, to a workpiece (either through a short or an arc between the welding electrode and the workpiece), through a second welding cable (or a second side of a welding cable), and back to a second side of the welding output of the welding power source.

"Welding cable", as used herein, refers to the electrical cable that may be connected between a welding power source and a welding electrode and workpiece (e.g. through a welding wire feeder) to provide electrical power to create an arc between the welding electrode and the workpiece.

"Welding output", as used herein, may refer to the electrical output circuitry or output port or terminals of a welding power source, or to the electrical power, voltage, or current provided by the electrical output circuitry or output port of a welding power source (e.g., a welding output current waveform or a cyclical welding waveform process).

"Computer memory", as used herein, refers to a storage device configured to store digital data or information which can be retrieved by a computer or processing element.

"Controller", as used herein, refers to the logic circuitry and/or processing elements and associated software or program involved in controlling a welding power source.

The term "signal", as used herein, may refer to a welding output current waveform produced by an arc welding system, or some other type of signal, data, or information (e.g., an analog or digital control signal).

The term "AC welding" is used generally herein and may refer to actual AC welding, DC welding in both positive and negative polarities, variable polarity welding, and other hybrid welding processes.

The term "de-energized" as used herein refers to having little or no current or power applied. For example, a welding electrode may be in a de-energized state when a welding output current sufficient to establish or maintain an arc between the electrode and a workpiece is not applied, but a low level signal is applied to the electrode for sensing when the electrode touches the workpiece.

The term "DC polarity" as used herein refers to a positive polarity or a negative polarity. The term "alternating polarity" as used herein refers to switching back and forth between a positive polarity and a negative polarity (e.g., an AC welding output current waveform switches back and forth between positive and negative polarities). The term "polarity type" as used herein may be one of a positive DC polarity, a negative DC polarity, an alternating polarity, or some combination thereof.

The term "stubbing" refers to the undesirable situation where the welding electrode sticks to the workpiece (e.g., when trying to establish an arc between the electrode and the workpiece).

FIG. 1 illustrates a schematic block diagram of an exemplary embodiment of an arc welding system 100 operatively connected to a consumable welding electrode E and a workpiece W. The system 100 includes a switching power supply 105 having a power conversion circuit 110 and a bridge switching circuit 180 providing welding output power between the welding electrode E and the workpiece W. The power conversion circuit 110 may be transformer based with a half bridge output topology. For example, the power conversion circuit 110 may be of an inverter type that includes an input power side and an output power side, for example, as delineated by the primary and secondary sides, respectively, of a welding transformer. Other types of power conversion circuits are possible as well such as, for example, a chopper type having a DC output topology. The system 100 also includes a bridge switching circuit 180 that is operatively connected to the power conversion circuit 110 and is configured to switch a direction of the polarity of the welding output current (e.g., for AC welding). In accordance with an embodiment, the bridge switching circuit 180 of the switching power source 105 is configured to allow fast switching between welding output polarities to accommodate the methods described herein.

The system 100 further includes a waveform generator 120 and a controller 130. The waveform generator 120 generates welding waveforms at the command of the controller 130. A waveform generated by the waveform generator 120 modulates the output of the power conversion circuit 110 to produce the welding output current between the electrode E and the workpiece W. The controller 130 also commands the switching of the bridge switching circuit 180 and may provide control commands to the power conversion circuit 110.

The system 100 may further include a voltage feedback circuit 140 and a current feedback circuit 150 to monitor the welding output voltage and current between the electrode E and the workpiece W and provide the monitored voltage and current back to the controller 130. The feedback voltage and current may be used by the controller 130 to make decisions with respect to modifying the welding waveform generated by the waveform generator 120 and/or to make other decisions that affect operation of the system 100, for example. In accordance with various embodiments, the controller 130 may be used to control the start of an arc welding process, the end of an arc welding process, or intermediate periods during an arc welding process when particular events occur.

In accordance with an embodiment, the switching power supply 105, the waveform generator 120, the controller 130, the voltage feedback circuit 140, and the current feedback circuit 150 constitute a welding power source of the system 100. The system 100 also includes a wire feeder 5 that feeds the consumable wire welding electrode E toward the workpiece W through a welding tool 6. Electrical power from the switching power supply 105 is applied to the welding electrode E via the wire feeder 5, in accordance with an embodiment. The wire feeder 5, the consumable welding electrode E, and the workpiece W are not part of the welding power source but may be operatively connected to the welding power source 100 via a welding output cable.

When an arc welding process is about to be started to create a weld, it is desirable to reliably establish an arc between the welding electrode and the workpiece in such a manner as to avoid stubbing and excessive splatter. A highly experienced welder may be able to gracefully start a weld in such a manner. However, systems and methods described herein provide for the graceful starting of a weld, even by a relatively inexperienced welder.

Figure 2:
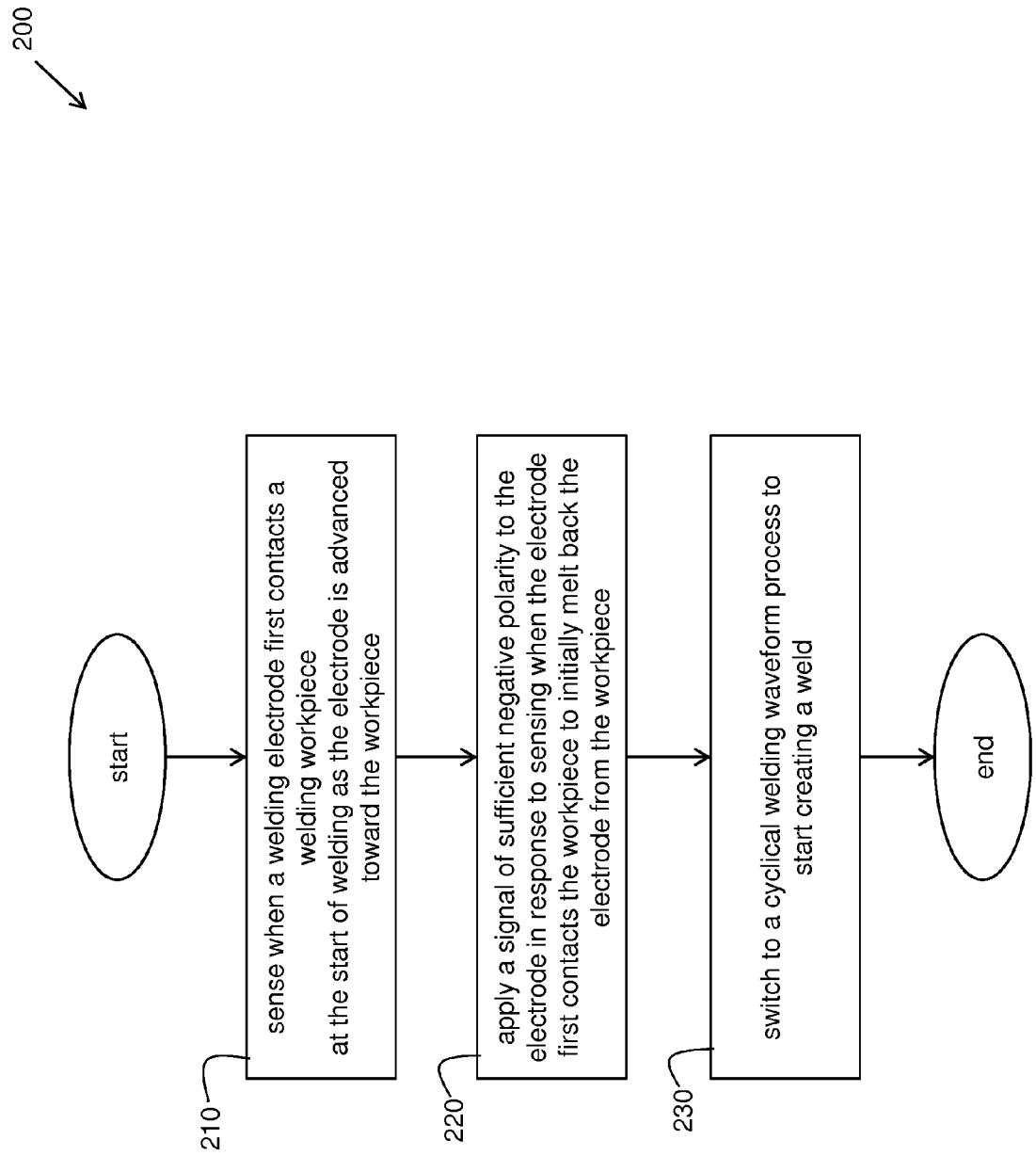
FIG. 2 illustrates a flowchart of a first exemplary embodiment of a method to start a welding process using the system of FIG. 1.

FIG. 2 illustrates a flowchart of a first exemplary embodiment of a method 200 to start a welding process using the system 100 of FIG. 1. In step 210 of the method 200, the system 100 senses when the welding electrode E first contacts the welding workpiece W at the start of welding as the electrode is advanced toward the workpiece by the wire feeder. In accordance with an embodiment, the system senses when the electrode contacts the workpiece by monitoring (e.g., using the controller 130) the voltage between the electrode and the workpiece using the voltage feedback circuit 140. When the voltage between the electrode and the workpiece goes to zero, the electrode is considered to be in contact with the workpiece. In accordance with another embodiment, the system senses when the electrode contacts the workpiece by detecting when a current starts flowing between the electrode and the workpiece using the current feedback circuit 150. When current starts flowing between the electrode and the workpiece, the electrode is considered to be in contact with the workpiece.

In step 220, a first signal of sufficient negative polarity is applied to the electrode in response to sensing when the electrode first contacts the workpiece to initially melt back the electrode from the workpiece. Electrode negative energy tends to cause the end of the electrode to readily melt back. However, in accordance with other embodiments, signals of other polarity types having sufficient energy to initially melt back the electrode from the workpiece may be applied. In step 230, the system switches to a cyclical welding waveform process (providing a second signal) to start creating a weld. The cyclical welding waveform process may be any of a number of arc welding processes that use DC positive, DC negative, or AC welding output current waveforms, for example, (or some combination thereof) and may be independent of the signal of sufficient negative polarity that is applied at the start of welding, in accordance with an embodiment.

Figure 3:
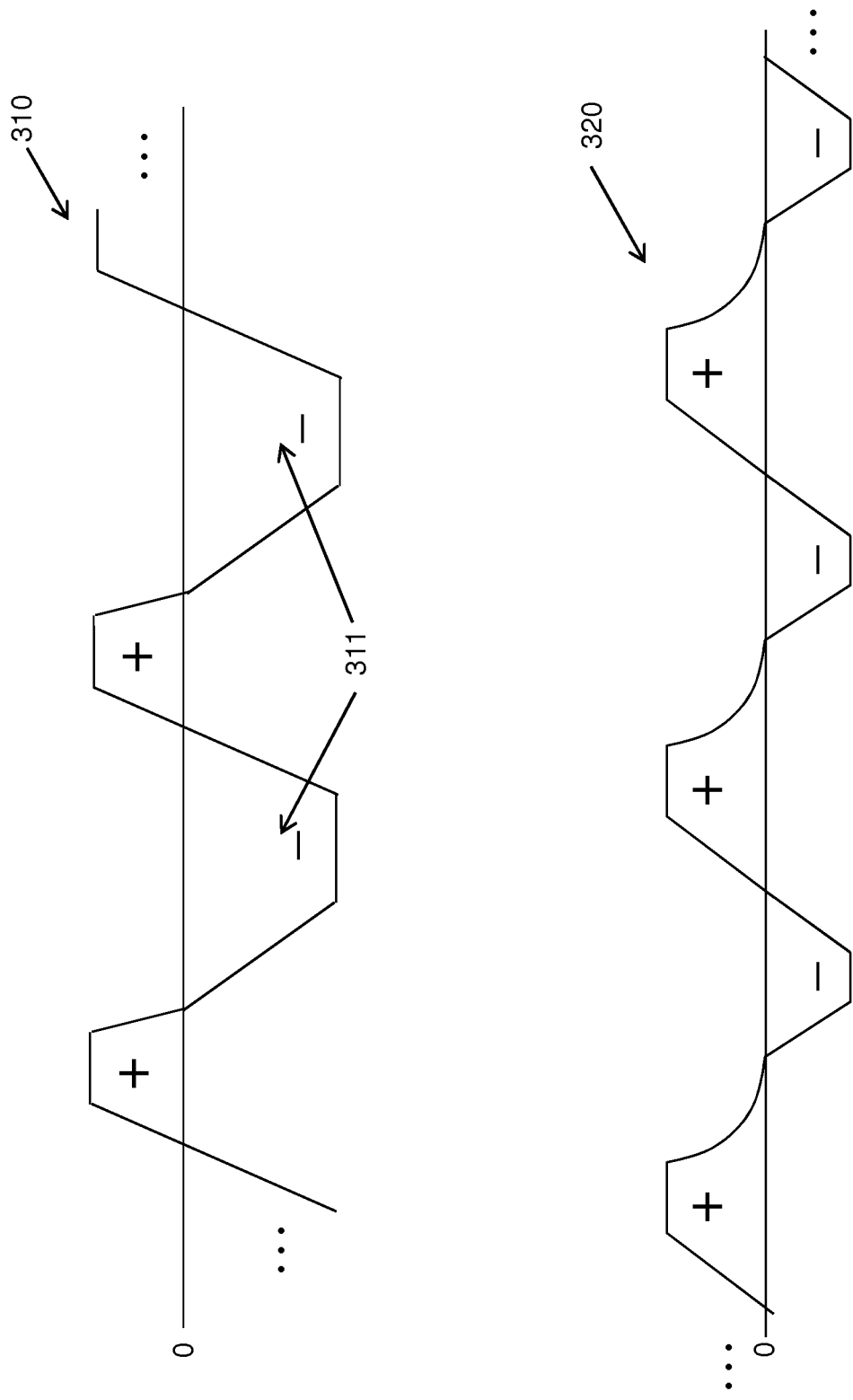
FIG. 3 illustrates exemplary embodiments of signals applied between a welding electrode and a welding workpiece during the method of FIG. 2.

FIG. 3 illustrates exemplary embodiments of signals applied between a welding electrode and a welding workpiece during the method 200 of FIG. 2. Signal 310 is an example of a welding output current waveform output by the system 100 that provides sufficient energy in the negative polarity 311 of the signal 310 to melt back the electrode from the workpiece at the start of welding. Once the electrode melts back from the workpiece (e.g., after applying the signal 310 for about 50-100 milliseconds), the system 100 switches to a cyclical welding waveform process providing the welding output current waveform 320, for example, to create the weld. In this manner, stubbing of the electrode is prevented and spatter is kept to a minimum at the start of welding. In accordance with an alternative embodiment, the signal 310 may simply be a single negative polarity pulse applied at the start of welding having sufficient energy to melt back the electrode from the workpiece. Furthermore, the signal 310 may simply be a single negative polarity pulse that is part of the signal 320, appearing at the beginning of the signal 320. Other embodiments of signals which first melt back the electrode from the workpiece and then proceed to create the weld are possible, in accordance with other embodiments of the present invention.

Figure 4:
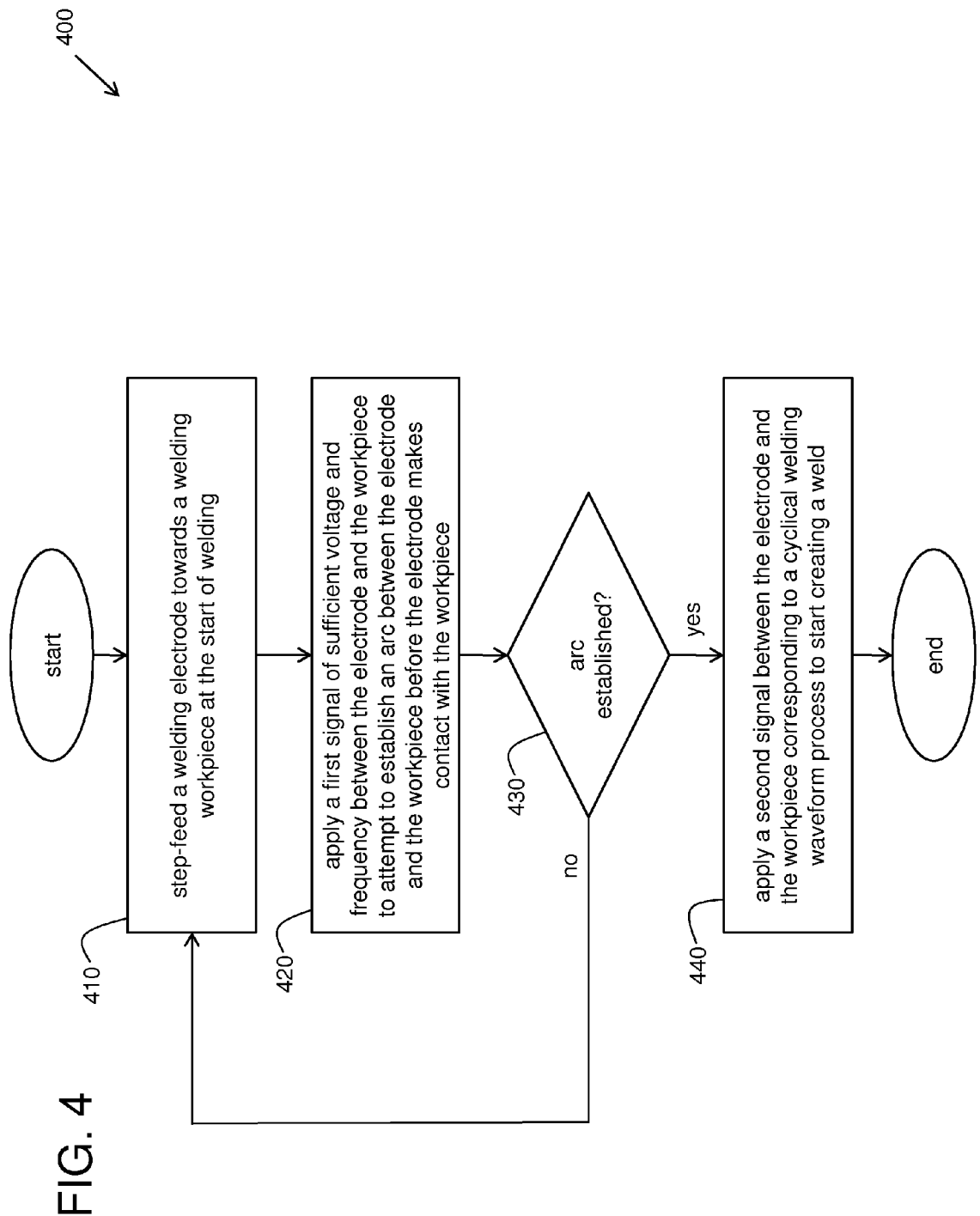
FIG. 4 illustrates a flowchart of a second exemplary embodiment of a method to start a welding process using the system of FIG. 1.

FIG. 4 illustrates a flowchart of a second exemplary embodiment of a method 400 to start a welding process using the system 100 of FIG. 1. In step 410 of the method 400, the welding electrode E is step-fed towards the welding workpiece at the start of welding. For example, the electrode may be stepped in increments of 1 millimeter, in accordance with an embodiment. In step 420, a first signal of sufficient voltage and frequency is applied between the electrode and the workpiece to attempt to establish an arc between the electrode and the workpiece before the electrode makes contact with the workpiece. In step 430, if an arc has not been established, the method reverts back to step 410. As the electrode is stepped toward the workpiece, the electrode sooner or later reaches a distance from the workpiece where the first signal establishes an arc.

Once an arc is established, then, in step 440, a second signal is applied between the electrode and the workpiece corresponding to a cyclical welding waveform process to start creating a weld after the arc is established by the first signal. The cyclical welding waveform process may be any of a number of arc welding processes that use DC positive, DC negative, or AC welding output current waveforms, for example, (or some combination thereof) and may be independent of the signal of sufficient voltage and frequency that is applied at the start of welding, in accordance with an embodiment. If the arc ever extinguishes during the welding process, the method 400 may once again be employed to re-start the arc and begin welding again.

In accordance with an alternative or optional embodiment, a dedicated high frequency generator circuit (HFGC) 190 may be provided and configured to generate the first signal of sufficient voltage and frequency to establish an arc between the electrode and the workpiece. In such an embodiment, the dedicated HFGC 190 provides the first signal and the switching power supply 105 provides the second signal corresponding to a cyclical welding waveform process.

Figure 5:
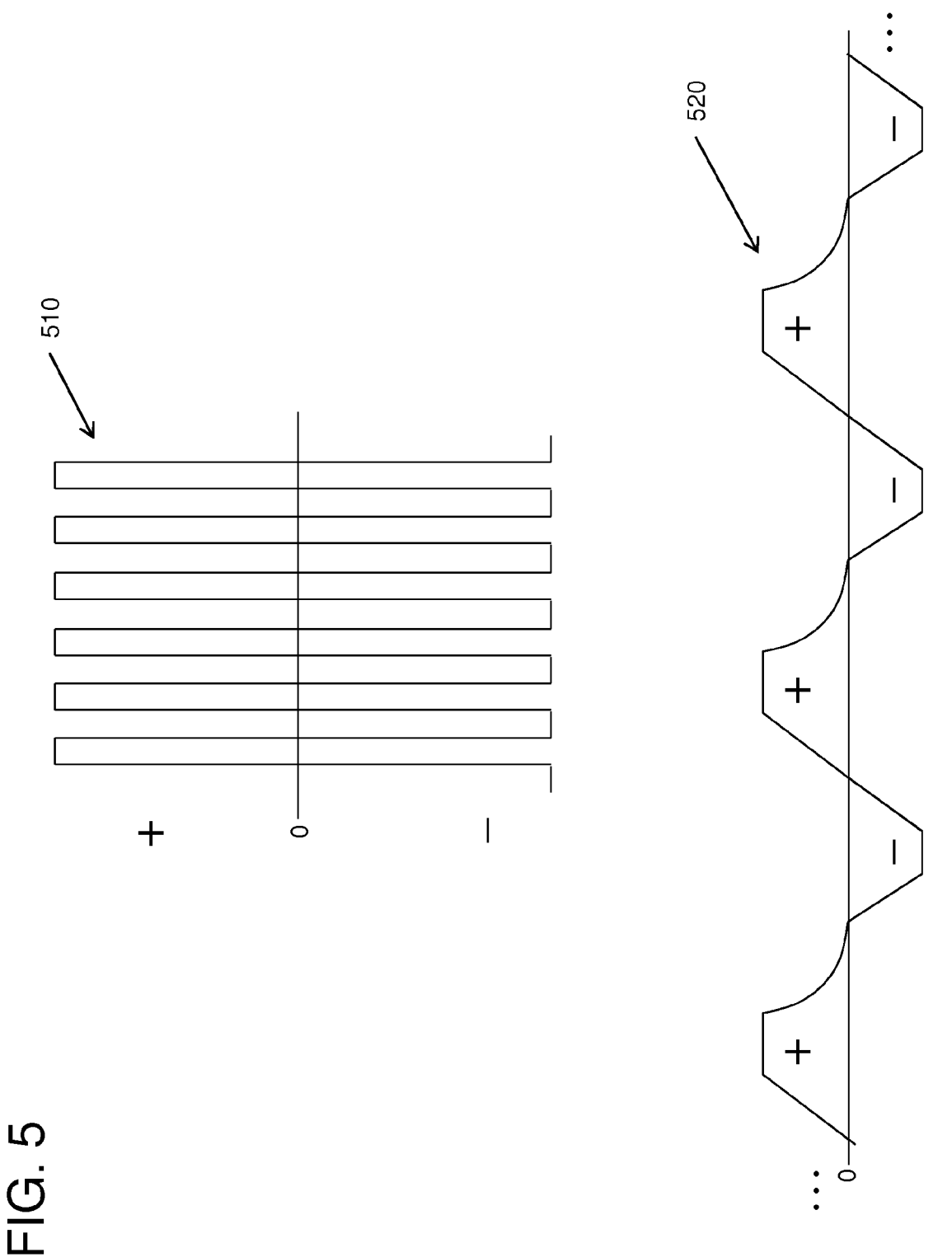
FIG. 5 illustrates exemplary embodiments of signals applied between a welding electrode and a welding workpiece during the methods of FIG. 4 and FIG. 6.
Figure 6:
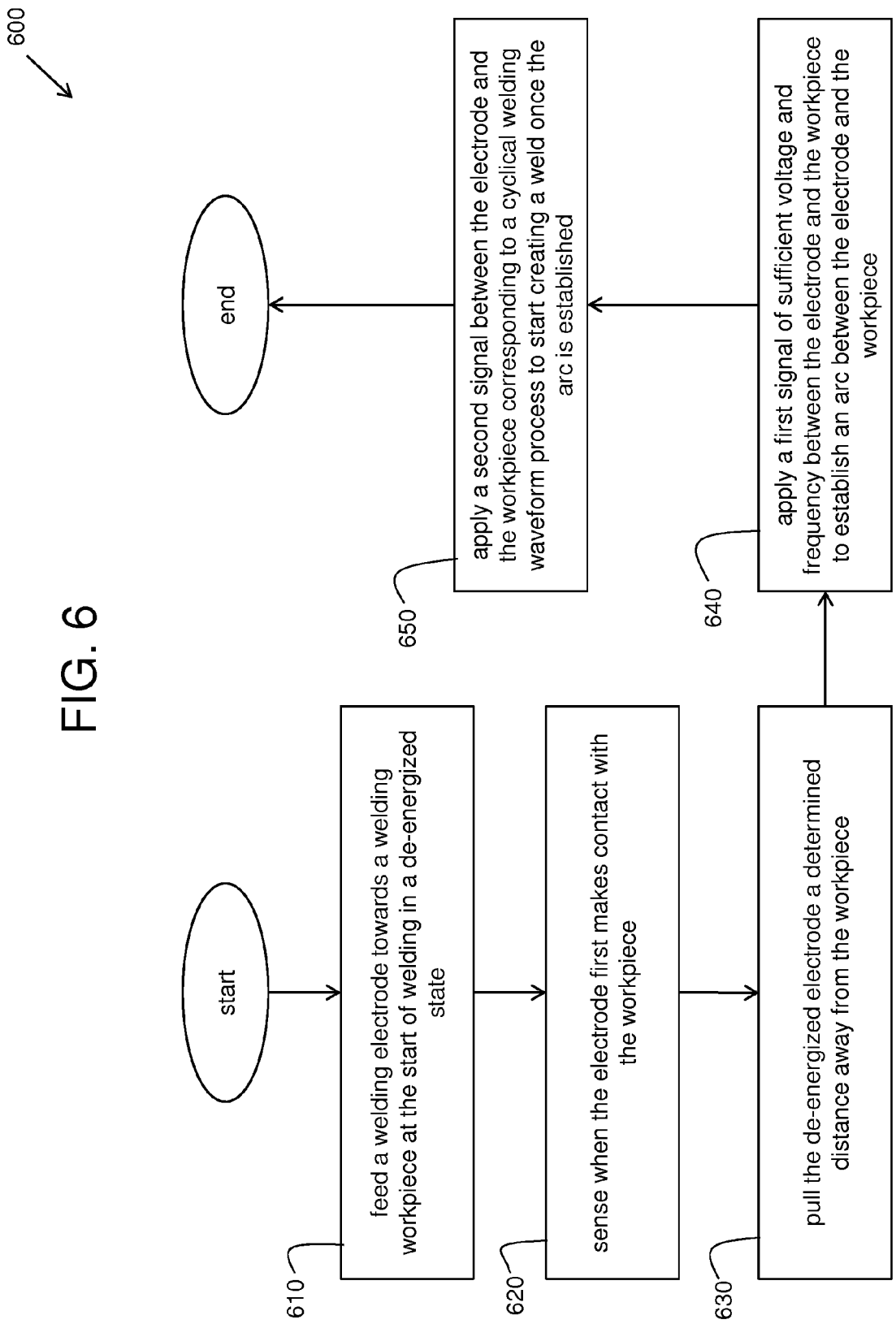
FIG. 6 illustrates a flowchart of a third exemplary embodiment of a method to start a welding process using the system of FIG. 1.

FIG. 5 illustrates exemplary embodiments of signals applied between a welding electrode E and a welding workpiece W during the methods 400 and 600 of FIG. 4 and FIG. 6. Signal 510 is a welding output current waveform output by the system 100 having sufficient voltage and frequency to establish an arc between the electrode and the workpiece, without the electrode having to first make contact with the workpiece. In accordance with one embodiment, the signal 510 provides a high voltage level at high frequency and is generated by the switching power supply 105. In accordance with an optional embodiment, the signal 510 is generated by the dedicated high frequency generator circuit (HFGC) 190 which is specifically configured for providing such a high voltage/high frequency signal. In accordance with an embodiment, the HFGC 190 may be operatively connected between the switching power supply 105 and the controller 130, and may be under the control of the controller 130. Once the arc is established, the system 100 switches to a cyclical welding waveform process providing, for example, the welding output current waveform 520 to create the weld. In this manner, stubbing of the electrode is prevented and spatter is kept to a minimum at the start of welding.

FIG. 6 illustrates a flowchart of a third exemplary embodiment of a method 600 to start a welding process using the system 100 of FIG. 1. In step 610 of the method 600, a welding electrode E is fed towards a welding workpiece W at the start of welding in a de-energized or low current state (i.e., a non-welding state). In step 620, the system 100 senses when the electrode first makes contact with the workpiece (e.g., by sensing a completion of the circuit when the electrode touches the workpiece using the current feedback circuit 150). In step 630, the system pulls the de-energized electrode back a determined distance from the workpiece in response to sensing the contact. In step 640, a first signal (e.g., 510 of FIG. 5) of sufficient voltage and frequency is applied between the electrode and the workpiece to establish an arc between the electrode and the workpiece (e.g., for 50-100 milliseconds).

In step 650, a second signal (e.g., 520 of FIG. 5) is applied between the electrode and the workpiece corresponding to a cyclical welding waveform process to start creating a weld after the arc is established. In accordance with an embodiment, when the arc is established, the second signal may be ramped up to a normal welding current level along with the wire feed speed to create a smooth transition from arc establishment. Again, the cyclical welding waveform process may be any of a number of arc welding processes that use DC positive, DC negative, or AC welding output current waveforms, for example, (or some combination thereof) and may be independent of the signal of sufficient voltage and frequency that is applied at the start of welding, in accordance with an embodiment.

When a welding process is about to end, magnetic flux lines that have built up in the workpiece may cause the arc to move around in an undesired manner (this is called arc blow). As a result, the void at the end of a weld may not be properly filled, leaving a crater that is susceptible to cracking. In accordance with an embodiment, the polarity of the output welding waveform may be changed near the end of the welding process to prevent or at least minimize the arc blow effect, thereby allowing the void or crater at the end of the weld to be properly filled.

Figure 7:
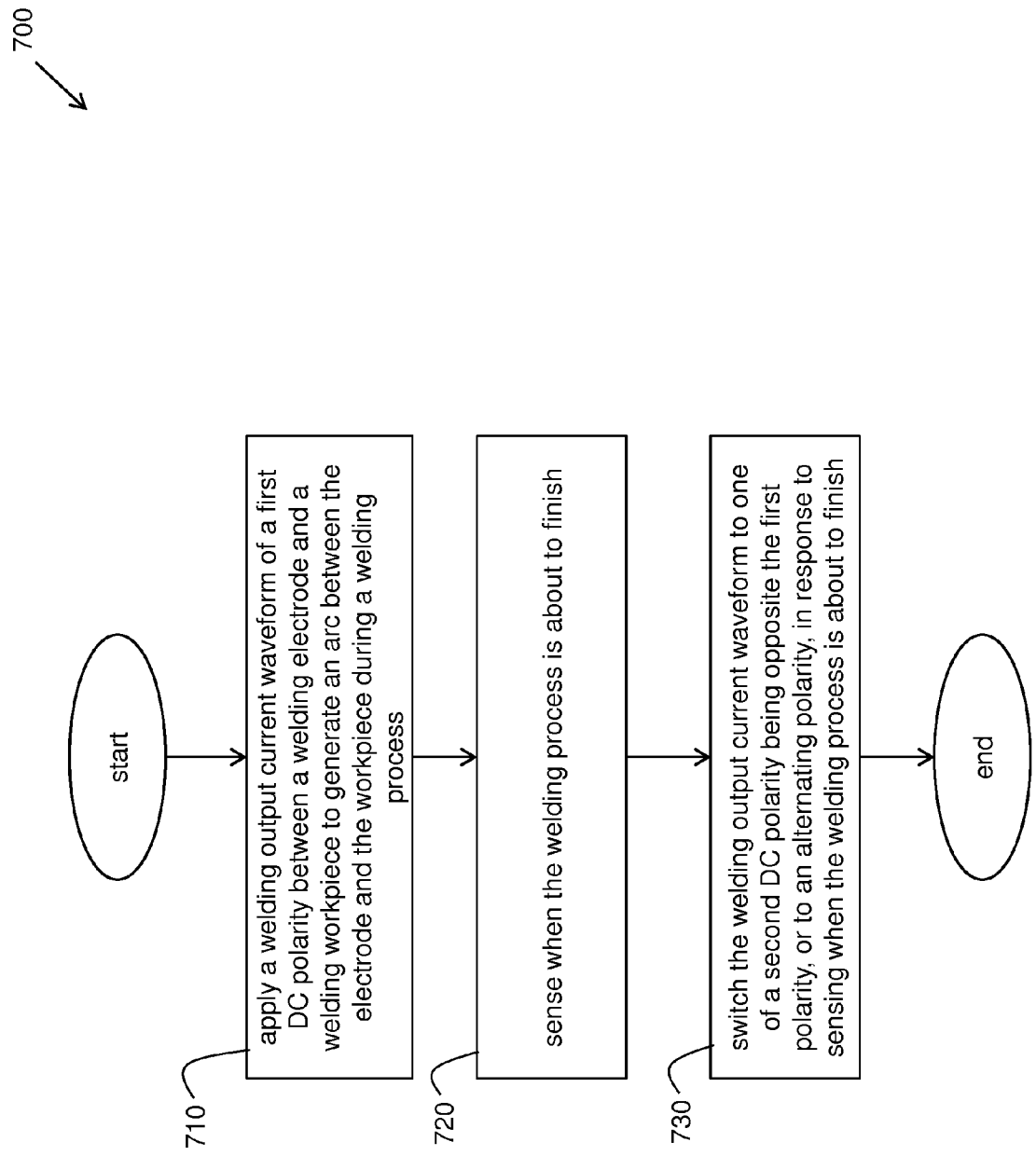
FIG. 7 illustrates a flowchart of an exemplary embodiment of a method to finish a welding process using the system of FIG. 1.

FIG. 7 illustrates a flowchart of an exemplary embodiment of a method 700 to finish a welding process using the system 100 of FIG. 1. In step 710 of the method 700, a welding output current waveform of a first DC polarity (DC+ or DC−) is applied between a welding electrode and a welding workpiece to generate an arc between the electrode and the workpiece during a welding process to create a weld. In step 720, the system senses when the welding process is about to end or finish. In accordance with an embodiment, when a welder releases a trigger on a welding tool, the trigger signal to the wire feeder may be lost, indicating that the welding process is about to end. In this manner, the system may sense when the welding process is about to end. In accordance with other embodiments, other methods and means may be used to indicate or signal the end of a welding process. For example, the system may be configured such that a welder may release-pull-release the trigger on the welding tool in quick succession, creating a determined trigger signal sequence, to indicate that welding is about to finish.

In step 730, the welding output current waveform is switched to a different waveform of a second DC polarity being opposite the first polarity, or to an alternating polarity, in response to sensing when the welding process is about to end. As a result of switching the polarity type, any arc blow due to the build-up of magnetic flux lines is disrupted, and the void or crater at the end of the weld may be properly filled using the different waveform (e.g., for several seconds) without the welder having to go back and fill the crater after the fact.

Figure 8:
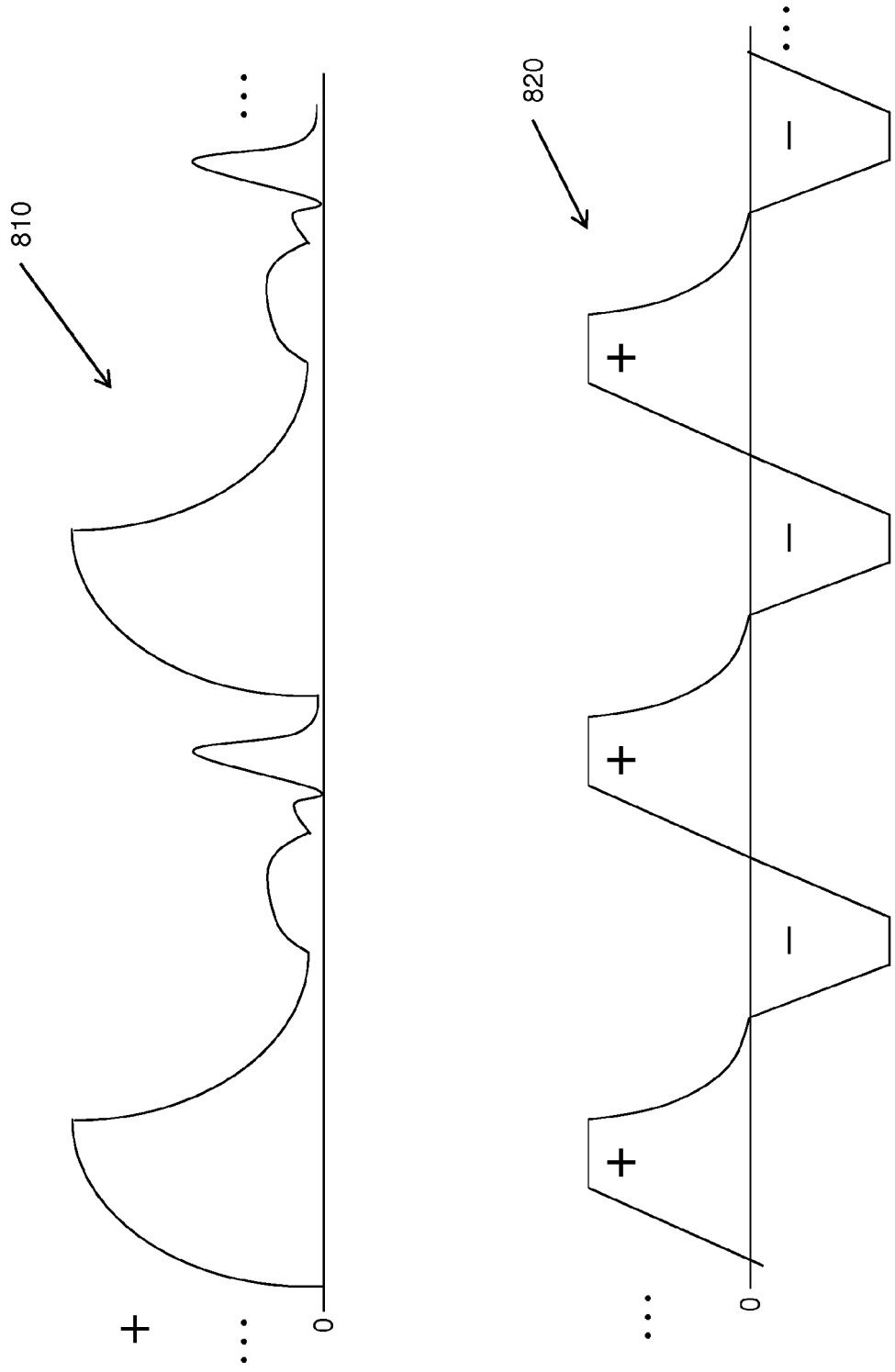
FIG. 8 illustrates exemplary embodiments of signals applied between a welding electrode and a welding workpiece during the method of FIG. 7.

FIG. 8 illustrates exemplary embodiments of signals applied between a welding electrode and a welding workpiece during the method 700 of FIG. 7. Signal 810 is a welding output current waveform of a first DC polarity (a DC+ polarity) that may be applied between a welding electrode and a welding workpiece to generate an arc between the electrode and the workpiece during a welding process to create a weld. Signal 820 is a second signal being of an alternating polarity (an AC waveform) that the system switches to in response to sensing when the welding process is about to end. The AC waveform 820 diminishes the effects of the built-up magnetic flux lines in the workpiece, allowing the arc to stay in proper position on the weld such that the void at the end of the weld may be filled.

Figure 9:
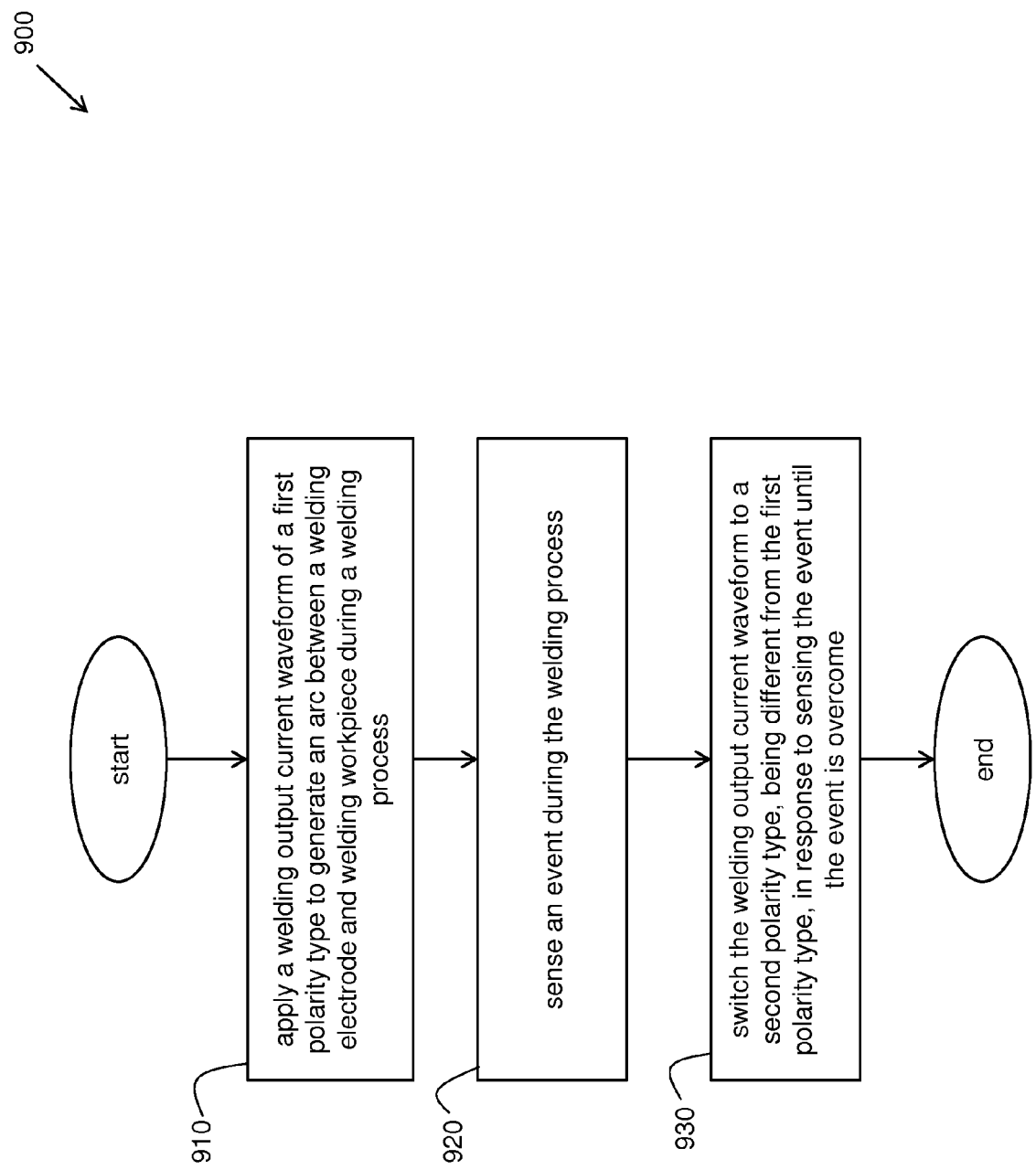
FIG. 9 illustrates a flowchart of an exemplary embodiment of a method to respond to an event during a welding process using the system of FIG. 1.

FIG. 9 illustrates a flowchart of an exemplary embodiment of a method 900 to respond to an event during a welding process using the system 100 of FIG. 1. In step 910 of the method 900, a welding output current waveform of a first polarity type is applied to generate an arc between a welding electrode and a welding workpiece during a welding process to create a weld. In step 920, an event is sensed by the system during the welding process. The event may be the extinguishing of the arc during the welding process or stubbing, for example. Such arc extinction or stubbing may be sensed by the system using the voltage feedback circuit and/or the current feedback circuit to sense a characteristic change in voltage and/or current between the electrode and the workpiece due to the event. Other types of events may be possible to sense and respond to as well, in accordance with various other embodiments.

In step 930, the welding output current waveform is switched, at least momentarily (e.g., for 50-100 milliseconds), to a different waveform having a second polarity type in response to sensing the event. The different waveform may be one of the waveforms previously described herein to burn back the electrode from the workpiece in the case of stubbing, or to diminish arc blow. Other types of different waveforms having second polarity types may be possible as well, to counter other undesirable events that may occur during the welding process. Therefore, depending on the nature of the event (e.g., arc blow, stubbing), the welding process is able to quickly recover from the negative effects of the event by switching the polarity type of the waveform. Once the event is overcome, the system may switch back to the original welding output current waveform of the first polarity type to continue welding.

Figure 10:
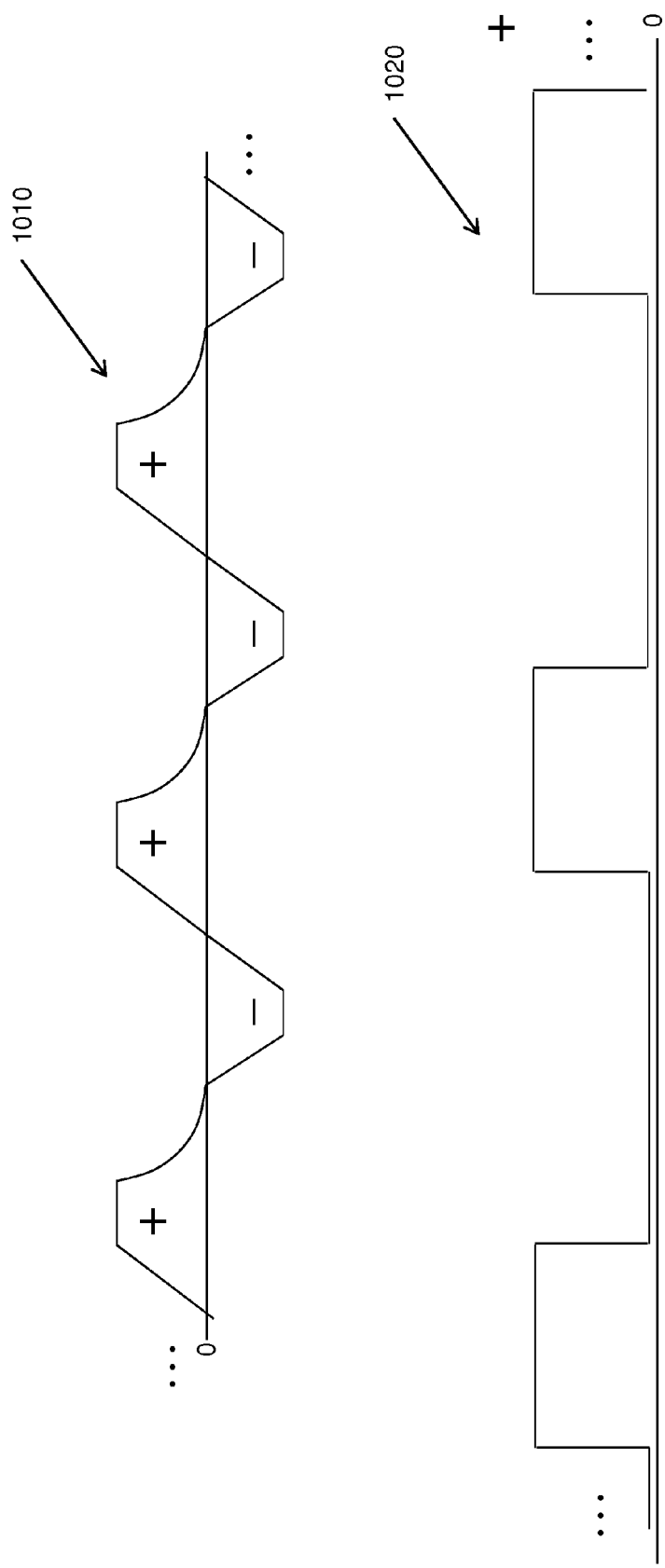
FIG. 10 illustrates exemplary embodiments of signals applied between a welding electrode and a welding workpiece during the method of FIG. 9.

FIG. 10 illustrates exemplary embodiments of signals applied between a welding electrode and a welding workpiece during the method 900 of FIG. 9. Signal 1010 is a welding output current waveform of a first polarity type (e.g., an AC waveform) that may be applied between a welding electrode and a welding workpiece to generate an arc between the electrode and the workpiece during a welding process to create a weld. Signal 1020 is a second signal being of a second polarity type (a DC positive waveform) that the system switches to in response to sensing an event during the welding process.

In summary, systems and methods for facilitating the starting and stopping of arc welding processes, as well as for responding to events in mid-weld, are disclosed. Specially designed signals may be briefly applied between a welding electrode and a welding workpiece at the start and end of a welding process to gracefully and properly start and stop a weld. Furthermore, specially designed signals may be briefly applied in the middle of a welding process if determined undesirable events occur to counter the effects of the undesirable events. In accordance with an embodiment, application of the specially designed signals and the normal cyclical welding waveform processes is under the control of the controller 130 of the system 100, which is a software programmable device.

In appended claims, the terms "including" and "having" are used as the plain language equivalents of the term "comprising"; the term "in which" is equivalent to "wherein." Moreover, in appended claims, the terms "first," "second," "third," "upper," "lower," "bottom," "top," etc. are used merely as labels, and are not intended to impose numerical or positional requirements on their objects. Further, the limitations of the appended claims are not written in means-plus-function format and are not intended to be interpreted based on 35 U.S.C. §112, sixth paragraph, unless and until such claim limitations expressly use the phrase "means for" followed by a statement of function void of further structure. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. Moreover, certain embodiments may be shown as having like or similar elements, however, this is merely for illustration purposes, and such embodiments need not necessarily have the same elements unless specified in the claims.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiments disclosed, but that the claimed subject matter will include all embodiments falling within the scope of the appended claims.

What is claimed is:

1. An arc welding system comprising:
a power source configured to provide a welding output current to generate an arc between a consumable welding electrode and a welding workpiece during a welding process; and
a wire feeder operatively connected to the power source and configured to feed the consumable welding electrode during the welding process,
wherein the power source and the wire feeder are further configured to:
sense when the consumable welding electrode first contacts the workpiece as the consumable welding electrode is advanced toward the workpiece by the wire feeder;
apply a first signal of sufficient energy to the consumable welding electrode in response to sensing when the consumable welding electrode first contacts the workpiece to initially melt back the consumable welding electrode from the workpiece without creating a weld, wherein the first signal comprises a first waveform; and
apply a second signal comprising a second cyclical waveform to start creating the weld, wherein the first waveform is separate from the second cyclical waveform.

2. The system of claim 1, wherein a negative polarity portion of the first signal provides the sufficient energy to initially melt back the consumable welding electrode from the workpiece.

3. The system of claim 1, wherein the second signal comprises one or more of a cyclical DC positive welding output current signal, a cyclical DC negative welding output current signal, or a cyclical AC welding output current signal.

4. The system of claim 1, wherein the power source includes a voltage feedback circuit operatively connected to a controller and configured to sense when the consumable welding electrode first contacts the workpiece at the start of welding.

5. The system of claim 1, wherein the power source includes a current feedback circuit operatively connected to a controller and configured to sense when the consumable welding electrode first contacts the workpiece at the start of welding.

6. An arc welding system comprising:
a power source configured to provide a welding output current to generate an arc between a consumable welding electrode and a welding workpiece during a welding process; and
a wire feeder operatively connected to the power source and configured to feed the consumable welding electrode during the welding process,
wherein the power source and the wire feeder are further configured to:
step-feed the consumable welding electrode toward the workpiece at the start of welding such that the consumable welding electrode is fed toward the workpiece in a plurality of increments; and
after each increment, apply a first signal of sufficient voltage and frequency between the consumable welding electrode and the workpiece in an attempt to establish the arc between the consumable welding electrode and the workpiece before the consumable welding electrode first makes contact with the workpiece.

7. The system of claim 6, wherein, upon establishment of the arc between the consumable welding electrode and the workpiece, the power source and the wire feeder are further configured to subsequently apply a second signal between the consumable welding electrode and the workpiece to start creating a weld once the arc is established.

8. The system of claim 7, wherein the second signal comprises one or more of a cyclical DC positive welding output current signal, a cyclical DC negative welding output current signal, or a cyclical AC welding output current signal.

9. The system of claim 6, further comprising a dedicated high frequency generator circuit configured to generate the first signal of sufficient voltage and frequency.

10. An arc welding system comprising:
a power source configured to provide a welding output current to generate an arc between a consumable welding electrode and a welding workpiece during a welding process; and
a wire feeder operatively connected to the power source and configured to feed the consumable welding electrode during the welding process,
wherein the power source and the wire feeder are further configured to:
feed the consumable welding electrode at the start of welding toward the workpiece in a deenergized state,
sense when the consumable welding electrode first makes contact with the workpiece,
pull the de-energized consumable welding electrode a determined distance away from the workpiece,
apply a first signal of sufficient voltage and frequency between the consumable welding electrode and the workpiece to establish the arc between the consumable welding electrode and the workpiece, and
apply a second signal between the consumable welding electrode and the workpiece corresponding to a cyclical welding waveform process to start creating a weld once the arc is established, wherein a current level of the second signal is ramped up to a determined welding current level to create a smooth transition from the establishment of the arc.

11. An arc welding system comprising:
a power source configured to provide a welding output current waveform of a first DC polarity to generate an arc between a consumable welding electrode and a welding workpiece during a welding process; and a wire feeder operatively connected to the power source and configured to feed the consumable welding electrode during the welding process, wherein the power source and the wire feeder are further configured to sense when the welding process is about to finish and switch the welding output current waveform to one of a second DC polarity being opposite the first polarity, or to an alternating polarity, in response to sensing when the welding process is about to finish.

12. The system of claim 11, wherein a lost trigger signal to the wire feeder indicates that the welding process is about to finish.

13. The system of claim 11, wherein a determined trigger signal sequence to the wire feeder indicates that the welding process is about to finish.

14. An arc welding system comprising:

a power source configured to provide a welding output current waveform of a first polarity type to generate an arc between a consumable welding electrode and a welding workpiece during a welding process; and a wire feeder operatively connected to the power source and configured to feed the consumable welding electrode during the welding process, wherein the power source and the wire feeder are further configured to sense an event during the welding process and switch the welding output current waveform to a second polarity type, being different from the first polarity type, in response to sensing the event until the event is overcome.

15. The system of claim 14, wherein the event includes one or more of arc extinction or stubbing.

16. The system of claim 14, wherein the welding output waveform having the second polarity type is configured to affect one or more of arc re-ignition, electrode burn back from the workpiece, or diminished arc blow.

17. The system of claim 14, wherein the first polarity type includes one of an alternating polarity type, a DC positive polarity type, or a DC negative polarity type.

18. The system of claim 14, wherein the second polarity type includes one of an alternating polarity type, a DC positive polarity type, or a DC negative polarity type.

\* \* \* \* \*